April 28, 1953 — V. C. BALTZ ET AL — 2,636,431
DEVICE FOR COOKING MEAT AND TOASTING BUNS
Filed April 9, 1948
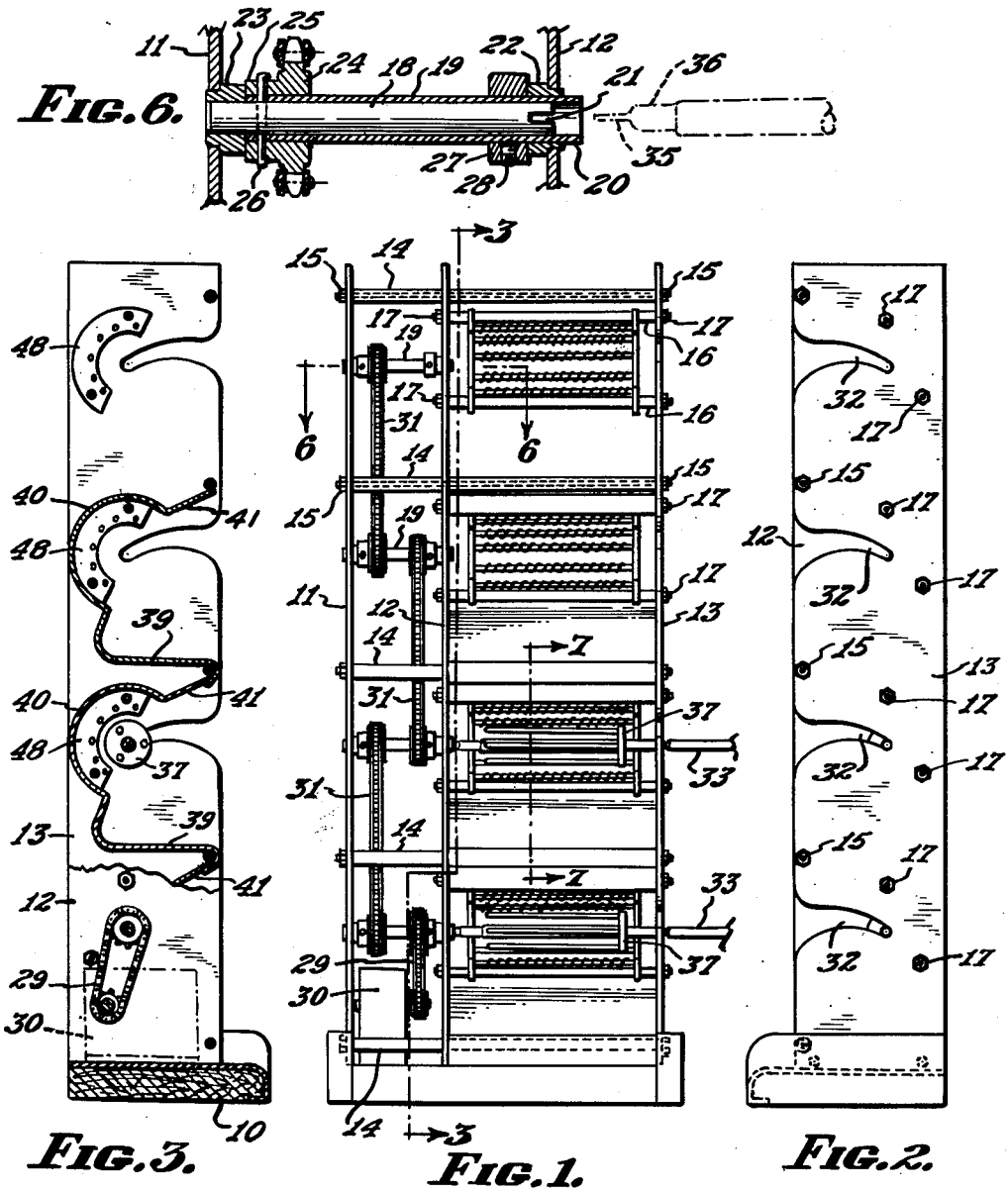
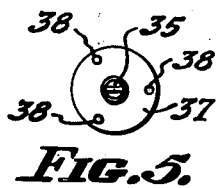
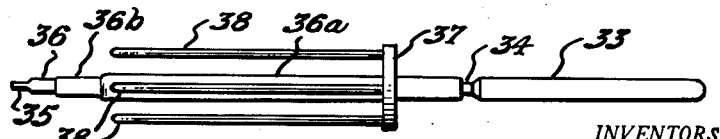
INVENTORS.
VALDAN C. BALTZ
AND LELAND A. POMEROY.
BY Allen v Allen
ATTORNEYS.

April 28, 1953 V. C. BALTZ ET AL 2,636,431
DEVICE FOR COOKING MEAT AND TOASTING BUNS
Filed April 9, 1948 2 SHEETS—SHEET 2
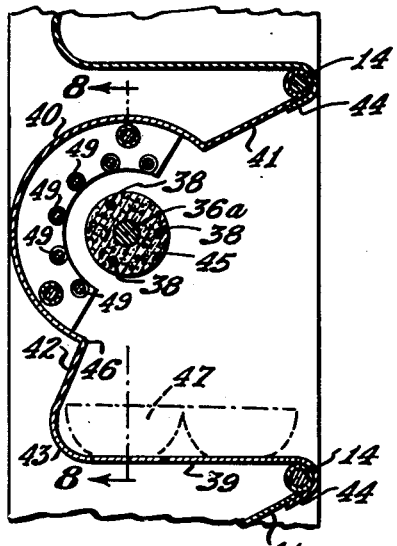
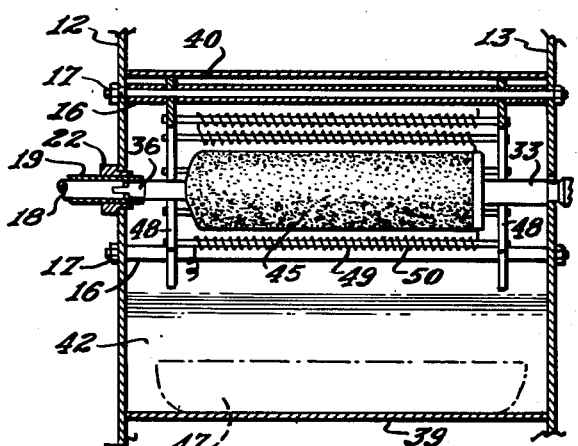
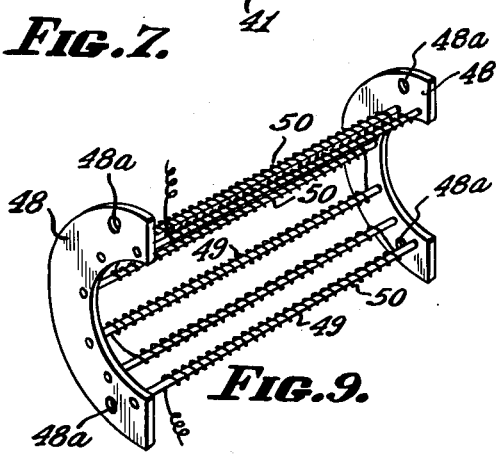
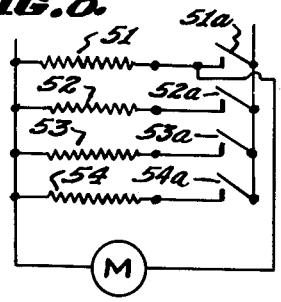
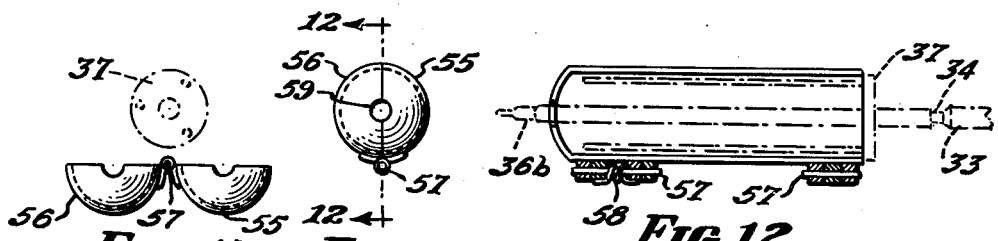
INVENTOR.
VALDAN C. BALTZ
BY AND LELAND A. POMEROY
Allen v Allen
ATTORNEYS.

Patented Apr. 28, 1953

2,636,431

UNITED STATES PATENT OFFICE 2,636,431

DEVICE FOR COOKING MEAT AND TOASTING BUNS

Valdan C. Baltz and Leland A. Pomeroy, Middletown, Ohio, assignors to Milroy Enterprises Inc., Middletown, Ohio, a corporation of Ohio Application April 9, 1948, Serial No. 20,028

2 Claims. (Cl. 99—339)

This invention relates to a device for cooking meat and toasting buns. Devices according to our invention can be made of any suitable size so as to handle either small or large demands, so that these devices are susceptible to use in the home or in hot-dog stands, barbecue stands, drug stores, restaurants, and the like.

Heretofore, ground beef in the form of so-called "hamburgers" has been cooked in a hot plate in the form of a patty of suitable diameter and thickness. For consumption the hamburger is placed in a circular bun and is eaten as a sandwich. To our knowledge it has not heretofore been possible to cook ground beef in the manner in which barbecued meats are cooked— that is by impaling it upon a spit and rotating it slowly during the cooking period.

The cooking of meat while rotating is attended by certain advantages in producing cooked meat of better flavor and without loss of the natural juices thereof, and it is therefore an object of our invention to provide a device by means of which ground beef or the like may be cooked upon a rotating member.

It is another object of our invention to provide a device as outlined above by means of which a bun can be toasted while the meat is being cooked and in which the bun to be toasted is disposed beneath the rotating meat so that any juices dripping from the meat will drop onto the bun and will thus not be lost. In connection with this it is another object of our invention to provide a novel cooking chamber which is so configured that the heat rays which serve to cook the meat are partially shielded from the bun so that the bun will not be burnt or overtoasted.

It is another object of our invention to provide a novel impaling member or spit upon which the meat is held while being rotated.

A still further object of our invention involves the provision of a forming mold for use in connection with said impaling member or spit.

Further objects of our invention include the provision of a device as outlined which will be compact, neat in appearance, easily kept clean and relatively inexpensive.

This and other objects of our invention which we shall point out in more detail hereinafter, or which will be apparent to those skilled in the art upon reading these specifications, we accomplish by that certain construction and arrangement of parts of which we shall now describe an exemplary embodiment.

Reference is made to the drawings forming a part hereof and in which:

Figure 1 is a front elevational view of the device with all casing elements removed.

Figure 2 is a side elevational view of the same as seen from the right of Figure 1.

Figure 3 is a cross-sectional view taken on the irregular line 3—3 of Figure 1.

Figure 4 is an elevational view of an impaling member or spit.

Figure 5 is an end elevational view of the same as seen from the left of Figure 4.

Figure 6 is a detailed sectional view taken on the line 6—6 of Figure 1, but on an enlarged scale.

Figure 7 is a fragmentary cross-sectional view taken on the line 7—7 of Figure 1, also to an enlarged scale.

Figure 8 is a fragmentary sectional view taken on line 8—8 of Figure 7.

Figure 9 is a perspective view of the heating elements for one of the cooking chambers.

Figure 10 is a wiring diagram.

Figure 11 is an end elevational view of a molding member.

Figure 12 is a cross-sectional view of the same taken on the line 12—12 of Figure 11, and Figure 13 is a view similar to Figure 11, but showing the molding member in open position.

Briefly in the practice of our invention we provide a plurality of cooking chambers which may be disposed in vertical alignment with bearing means for supporting in said respective chambers a number of impaling members or spits. We provide driving means to drive all the impaling members and heating elements in each of the cooking chambers for cooking the meat. The impaling members are mounted above the centers of the cooking compartments which are provided with partly cylindrical upper rear and rear upper walls which serve to reflect the heat rays to the axis of the impaling member. The lower portion of each cooking chamber is formed as a flat shelf upon which a split bun may be placed for toasting.

Referring more in detail to the drawings, the device is preferably mounted on a base 10 and comprises three parallel vertical walls 11, 12 and 13. The walls 11 and 12 constitute the side walls of the driving train chamber and the walls 12 and 13 define the side walls of the cooking chambers.

The walls 11, 12 and 13 are secured together and held in alignment by means of a series of rods 14 having threaded ends of reduced diameter upon which the nuts 15 are engaged. Other similar bolts 16 are provided for spacing the wall 12 from the wall 13, and these are provided with the nuts 17.

For each cooking chamber there is provided a driving member and all the driving members are substantially of the same construction except the uppermost which is shown in detail in Figure 6. As best seen in Figure 6 each such member comprises a rod 18 surrounded by a sleeve 19. The sleeve 19 is preferably not co-extensive with the rod so that it projects beyond the rod at the end disposed toward the cooking chamber as seen at 20. The end of the rod 18 is notched or slotted as indicated at 21. The sleeve 19 is rotatable in a bearing collar 22 mounted in an aperture in the wall 12, and the rod 18 at the other end is rotatable in a bearing collar 23 mounted in an aperture in the wall 11. A sprocket 24 having a hub 25 is pinned as at 26 to the sleeve 19 and the rod 18, and a collar 27 having a set-screw 28 prevents axial movement of the rod and sleeve.

It may be mentioned that all of these assemblies except the uppermost, as will be clear from Figure 1, are provided with two sprockets instead of having the collar 27 and that the sprocket which replaces the collar 27 in the lowermost assembly is driven through chains 29 from the motor 30. Succeeding assemblies are then driven, as will be clear, by the chain 31 and since there are no further assemblies to be driven from the uppermost assembly the collar 27 replaces one of the sprockets. It will thus be clear that when the motor 30 is energized each of the assemblies, including a rod 18 and a sleeve 19, will be rotated. The portions 20 and 21 provide coupling sockets for the impaling members or spits, as will now be described.

The wall 13, as best seen in Figure 2, is provided with a series of arcuate slots 32, which are so arranged that the ends of the slots are axially aligned with the respective rods 18. The spits or impaling members as seen in Figure 4 comprise rods having handle portions 33, bearing notches 34 and flat end portions 35, which constitute the male coupling elements. The respective spits are inserted with the portions 35 entering the slots 21 and with the portions 36 of reduced diameter entering into the cup-like portion 20. The bearing notches 34 are engaged in the ends of the slots 32 with the handle portions 33 extending beyond the wall 13. When so engaged it will be clear that each of the spits or impaling members will be rotated and that any spit can be removed or inserted without stopping the driving mechanism.

The spit or impaling member is provided with a disc element 37 from which extends a series of rods 38 which are parallel to the axis of the spit and equally distributed thereabout. We have found that an impaling member of this form will support a non-coherent material like ground beef. Actually the piece of meat is impaled along four parallel lines so that the weight of the particles is more or less equally distributed and a tendency for clumps of ground beef to drop off is avoided.

The cooking chambers are all of a particular configuration which will now be described. More particular reference is made to Figures 7 and 8. Each of these chambers is provided with a flat bottom 39 upon which a bun to be toasted may be placed and the rear part of the upper wall of the chamber and the upper part of the rear wall of the chamber are formed as a part cylinder as indicated at 40. The cylindrical configuration 40 is disposed about the axis of the spit or impaling member at 36a. From the forward upper edge of the member 40 the upper wall slopes forwardly and upwardly as at 41, and from the lower edge of the member 40 the rear wall slopes upwardly as at 42 and is then curved as at 43 to form the bottom wall 39. The forward edge of the bottom wall 39 is return-bent as at 44 and engages over one of the rods 14. The portion 41 is wedged between the portion 44 and the next upper cooking chamber and its rod 14. In Figures 7 and 8 the meat to be cooked is shown impaled upon the spit and is indicated by the reference numeral 45. The projecting notch 46 joining the portions 40 and 42 is for the purpose of preventing direct impingement of the heat rays from the lowermost of the heating elements onto the bun. A split bun is shown in broken lines in Figures 7 and 8 at 47.

The heating elements are best seen in Figure 9 and may comprise C-shaped members of ceramic or other insulating material or metal, indicated at 48, on which are mounted rods 49 of ceramic or other insulating and heat resisting material upon which are wound the heating coils 50. It will be observed that the heating elements 50 are disposed at equal distances from the axis 36a so that substantially one-half of the circumference of a piece of meat is subjected to heat rays at any instant. The member 48 is preferably of a heat reflective material so that the heat rays are concentrated upon the rotating meat. The members 48 are mounted by means of rods 16 heretofore described passing through the holes 48a in the members 48 and with suitable spacers for alignment purposes. Preferably the entire cooking chamber comprising the portion 41, the partly cylindrical portion 40, the lower rear wall 42 and the shelf 39 is made from stainless steel which is easy to keep clean and which provides a highly heat reflective surface.

As shown in the wiring diagram of Figure 10, in which the groups of heating elements are indicated diagrammatically at 51, 52, 53 and 54, a series of switches are provide at 51a, 52a, 53a and 54a. The motor M is so connected to the element 51 that when the switch 51a is closed the motor is energized and the heating coil 51 is energized. In this way if it is desired to use only one cooking chamber the switch which controls the heating element for the uppermost chamber also starts the motor. The reason for selecting the upper cooking chamber is that it is then only necessary to clean the upper chamber. If it is desired to clean a lower chamber all the chambers above the one to be cleaned must be removed in order that that particular chamber may be removed. In assembling the chambers the lower one is placed in position first and then each succeeding one is inserted on top of the one preceding. For example, if it is desired to use two cooking chambers it will be preferable to use the two uppermost chambers. When the cooking is completed the two upper chambers may be removed and easily cleaned, and replaced without the necessity of disassembling any other chambers.

The meat for use in our machine, whether it be ground beef or any other suitable meat, will preferably be provided in substantially cylindrical shape and it will probably be advisable to provide it in frozen packages. As soon as the piece of meat has thawed somewhat it will be relatively easy to impale upon a spit.

It is, however, perfectly possible for the user to prepare the meat himself and to mix it with suitable seasoning materials according to his own recipe, so that the meat will be in a semi-fluid non-coherent form. In order to facilitate impaling such a mass we have provided a molding element as best seen in Figures 11 to 13 inclusive. This device comprises a split cylindrical case 5 closed at one end except for a central aperture. The two halves of the device indicated at 55 and 56 are substantially identical and are hinged together at 57 and are provided with the springs 58 which tend to throw the members 55 and 56 to the open position shown in Figure 13. The aperture 59 is of a size to receive the end portion 36b of the spit, and the other end of the device is open. In use the device in the condition shown in Figure 13 will be held in one hand and a suitable quantity of meat placed in one of the halves, whereupon by closing the hand the device is brought to the condition of Figure 11. The spit is then inserted from the open end as shown in broken lines in Figure 12 until the disc 37 is substantially home. Whereupon the grip of the hand is released and the molding member springs open to the position of Figure 13, leaving the meat firmly molded around and impaled upon the spit.

The impaled meat is then cooked by inserting the spit into the cooking chamber as heretofore described and as juices begin to be forced out of the meat the outer surface of the meat becomes moist, thereby serving to baste the meat and very little juice is lost. Any juice which does drip down off the meat is caught upon a bun as indicated at 47 in Figure 7. The juices falling onto the bun of course give to the bun a better flavor and to a certain extent take the place of butter. It is, of course, possible to place slices of cheese on the bun and these will be grilled while the meat is being cooked.

While our device is primarily intended for the cooking of ground meats it can also be used for the cooking of sausages, such as frankfurters or the like. For such use the spit of Figure 4 is replaced by a similar spit without the disc 37 and rods 38. The spit is simply pushed axially through the sausage and the cooking proceeds as before.

While we have shown a device embodying four cooking chambers, it is of course within the scope of our invention to provide more or less chambers. For example, the device may be made symmetrical about the drive chamber between the walls 11 and 12 whereby there would be an equal number of cooking chambers to the left of the wall 11 in Figure 1. Similarly more or less chambers may be provided in a vertical direction. For use in the home, for example, a device may be made having say only two cooking chambers.

It is also within the scope of our invention to provide a micro-switch in connection with each of the coupling sockets whereby any heating coil would be energized by insertion of the end of a spit into the coupling socket. Similarly spring loaded mechanisms may be provided to cause automatic shut-off at the conclusion of the cooking period for any of the cooking chambers.

It will also be understood that suitable casing members are provided to close the front and rear of the drive mechanism chamber and that a suitable cover member is provided for the top of the device. In the interest of clarity, such cover members have been omitted. The fronts of the cooking compartments are open and this gives to the device a distinct eye appeal in that the operation of the device involves the slow rotation of the spits and the red glow of the heating elements reflected from the members 42 exert a somewhat hypnotic effect upon the prospective consumer.

It will be understood that numerous modifications may be made without departing from the spirit of our invention, and we therefore do not intend to limit ourselves otherwise than as set forth in the claims which follow.

Having now fully described our invention, what we claim as new and desire to secure by Letters Patent is:

1. A structure for cooking a plurality of pieces of meat of generally cylindrical form and concurrently toasting buns, said structure including a casing comprising a cooking section, a plurality of cooking devices, and means for supporting said cooking devices within said cooking section one above the other, each said cooking device being constituted of a member having top, rear and bottom walls, said means for supporting said cooking devices within said cooking section comprising a plurality of rods fixed in said section, the forward end of a said bottom wall being returned bent and engaged over a said rod, the forward end of a said top wall of one cooking device being wedged between a said rod and the return bent portion of the bottom wall of the cooking device located next above said one cooking device, said structure also including impaling means for each cooking device, heating means disposed about the axis of said impaling means, and means for rotating said impaling means.

2. A plurality of devices for cooking pieces of meat of generally cylindrical form and concurrently toasting buns, each of said devices comprising: means for impaling said meat, bearing means for said impaling means, means for rotating said impaling means, and a cooking chamber in which said impaling means is rotated, a major portion of said cooking chamber having a cross section of substantially inverted 3 shape, the upper part of said major portion comprising a part cylinder about the axis of said impaling means, heating means disposed at equal distances from the axis of said impaling means in the region of said part cylinder, the open portion of said part cylinder being directed downwardly at an angle towards said impaling means, and the lowest part of said major portion comprising a flat bottom for said chamber, said bottom being joined to the forward and lowermost edge of said part cylinder by a wall slanting rearwardly from said forward and lowermost edge to the rear edge of said bottom, said forward and lowermost edge of said part cylinder thus constituting a shield to prevent burning of a bun placed on said flat bottom beneath said impaling means by direct impingement of the heat rays from the lower heating means, said forward and lowermost edge of said part cylinder extending to a position short of said impaling means whereby juices from said meat are free to fall on said bun, the wall of said part cylinder being constituted of a heat reflective material; the said plurality of cooking devices being located one above the other; a casing having a vertical dividing wall to provide a drive mechanism compartment and a cooking section; means for supporting said cooking devices within said cooking section; a driving coupling in said dividing wall for each of said impaling means, each said impaling means having a coupling element engageable with its respective driving coupling; a motor in said drive mechanism compartment, and transmission means also in said compartment for transmitting power from said motor to each of said driving couplings; the means for retaining said cooking devices within said cooking section comprising a plurality of rods fixed in said cooking section parallel to said impaling means, the forward end of a said flat bottom being return bent and engaged over a said rod, said cooking devices each having a wall slanting forwardly and upwardly from the forward and uppermost end of said part cylinder, the forward end of the last mentioned slanting wall of one cooking device being wedged between a said rod and the return bent portion of the flat bottom of the cooking device positioned next above said one cooking device.

VALDAN C. BALTZ.
LELAND A. POMEROY.

References Cited in the file of this patent

UNITED STATES PATENTS

| Number | Name | Date |
|---|---|---|
| 501,867 | Cacciateri | July 18, 1893 |
| 652,660 | Bradlee | June 26, 1900 |
| 839,236 | Vartanian | Dec. 25, 1906 |
| 982,044 | Felger | Jan. 17, 1911 |
| 1,182,040 | Ritthamer | May 9, 1916 |
| 1,476,215 | Pace | Dec. 4, 1923 |
| 1,541,472 | Born | June 9, 1925 |
| 1,630,644 | Troiel | May 31, 1927 |
| 1,704,621 | Matiska | Mar. 5, 1929 |
| 1,790,488 | Saunders et al. | Jan. 27, 1931 |
| 1,794,304 | Koch | Feb. 24, 1931 |
| 1,970,168 | Collins | Aug. 14, 1934 |
| 1,975,916 | Bech | Oct. 9, 1934 |
| 2,122,780 | Peyton | July 5, 1938 |
| 2,130,259 | Bonaguidi | Sept. 13, 1938 |
| 2,142,390 | Zerr | Jan. 3, 1939 |
| 2,156,860 | Lucas et al. | May 2, 1939 |
| 2,160,953 | Berbeles | June 6, 1939 |
| 2,225,861 | Dufeur | Dec. 24, 1940 |
| 2,245,220 | Nelson | June 10, 1941 |
| 2,310,349 | Bobo | Feb. 9, 1943 |
| 2,330,132 | Martin et al. | Sept. 21, 1943 |
| 2,348,545 | Kahn | May 9, 1944 |
| 2,435,704 | Wilkinson | Feb. 10, 1948 |
| 2,470,645 | Reichart | May 17, 1949 |

FOREIGN PATENTS

| Number | Country | Date |
|---|---|---|
| 572,816 | Germany | Aug. 14, 1931 |